US006664473B2

(12) United States Patent
Christman et al.

(10) Patent No.: US 6,664,473 B2
(45) Date of Patent: Dec. 16, 2003

(54) CONNECTOR ASSEMBLY FOR ARMORED CABLE

(75) Inventors: Scott Christman, Buffalo, MN (US); Ann Feitel, Plymouth, MN (US)

(73) Assignee: Interlink BT, Plymouth, MN (US)

( * ) Notice: Subject to any disclaimer, the term of this patent is extended or adjusted under 35 U.S.C. 154(b) by 0 days.

(21) Appl. No.: 10/102,792

(22) Filed: Mar. 22, 2002

(65) Prior Publication Data

US 2002/0134573 A1 Sep. 26, 2002

Related U.S. Application Data

(60) Provisional application No. 60/277,882, filed on Mar. 22, 2001.

(51) Int. Cl.[7] .......................... H02G 15/02; H02G 3/06

(52) U.S. Cl. .................... 174/74 R; 174/78; 174/84 R; 174/88 C

(58) Field of Search ............................ 174/74 R, 75 C, 174/79, 80, 84 R, 88 R, 88 C, 93, 78; 29/862, 871; 439/88, 877, 882

(56) References Cited

U.S. PATENT DOCUMENTS 3,001,169 A * 9/1961 Blonder ...................... 439/461
3,374,307 A * 3/1968 Rauen ......................... 174/89
3,646,496 A * 2/1972 Williams .................... 439/462
3,992,773 A * 11/1976 Duffner et al. ............... 29/862
4,022,966 A * 5/1977 Gajajiva ................. 174/65 SS
4,073,559 A 2/1978 Lawson, Jr.
4,250,350 A * 2/1981 Polimine ..................... 174/86
4,273,405 A * 6/1981 Law ........................... 439/462
4,331,374 A * 5/1982 Phillips ...................... 439/584
4,399,318 A 8/1983 Waters
4,487,462 A * 12/1984 Gale et al. .................... 439/92
4,490,576 A * 12/1984 Bolante et al. ......... 174/65 SS
4,606,603 A * 8/1986 Cairns ......................... 385/58
4,887,971 A 12/1989 Reuss et al.
4,907,982 A * 3/1990 Wagaman ................... 439/271
4,940,416 A * 7/1990 Wagaman et al. .......... 439/204
5,059,747 A * 10/1991 Bawa et al. ............ 174/65 SS
5,380,224 A 1/1995 DiCicco
5,536,185 A 7/1996 Guiol
5,618,208 A 4/1997 Crouse et al.
5,631,444 A 5/1997 Rook
5,720,630 A * 2/1998 Richmond et al. .......... 439/591
5,741,143 A 4/1998 Hotea et al.
6,468,100 B1 * 10/2002 Meyer et al. ............... 439/320

FOREIGN PATENT DOCUMENTS

DE 43 07 350 C1 * 3/1993 .......... H02G/15/00

* cited by examiner

*Primary Examiner*—William H. Mayo, III
(74) *Attorney, Agent, or Firm*—Moore, Hansen & Sumner

(57) ABSTRACT

A connector assembly suitable for use with armored cables. The connector assembly includes a sleeve that is received over and connected to an end of an armored cable. The conductors of the armored cable are connected to a contact holder that is received within the sleeve. A jacket is molded over the sleeve and a portion of the armored cable. A slip ring placed around the sleeve between the molded jacket and a flange of the sleeve secures a coupling nut thereover. The coupling nut secures mating portions of the connector assembly to one another so as to create a conductive pathway across the connector assembly.

14 Claims, 3 Drawing Sheets

CONNECTOR ASSEMBLY FOR ARMORED CABLE

THIS APPLICATION IS A CONTINUATION OF PROVISIONAL APPLICATION No. 60/277,828 FILED Mar. 22, 2001, NOW PENDING.

FIELD OF THE INVENTION

The present invention relates to a connector assembly for armored cable that provides a secure and steady grounding path across the connection for false and other stray voltage.

BACKGROUND OF THE INVENTION

Providing reliable connections to ground for industrial machinery is vital to the safe and continued operation of that machinery. Should a short circuit or fault condition arise in a piece of industrial machinery, it is all too possible that an operator or maintenance person working on that machine may be injured. In addition, fault conditions in the control system of an industrial machine may cause that machine to malfunction in a way that can cause injury to persons in the vicinity of the machine or can destroy product being processed by that machine.

One method of providing a grounding connection to an industrial machine or other type of device involves connecting a wire between the chassis of the machine or device in question and true ground. This connection may be made using a grounding path formed by a conductive rod driven into the soil and preferably into the water table. Another manner in which a grounding connection is provided to an industrial machine is through the cable that provides power or controlling signals to that machine. This may be accomplished by running an extra conductor through the cable that is connected between the chassis of the device in question and true ground or by forming a conductive sheath around the conductors that form the control or power cable itself.

An example of this former means for providing a ground is the apiaceous three pronged plug used on common household appliances. An example of the latter means of grounding is given in U.S. Pat. No. 5,631,444 to Rook. Rook's coupling device comprises an inner hollow support body and a separate ground sleeve that is received thereover. The grounding sleeve is sized to be received over the inner hollow support body in a coaxial relationship thereto. Furthermore, the grounding sleeve is sufficiently large that a wire mesh hose formed around an electrical cable may be received therebetween. The grounding sleeve of the Rook coupling is deformed as by crimping so as lock the wire mesh hose of the cable to the inner hollow support body of the coupling. A spring ring is used to rotatively secure a coupling nut to the inner hollow support body of the coupling. Rook does not disclose the formation of a continuous grounding connection from a coupling through the armor of an armored cable. Nor does Rook address how ground currents are to be reliably passed between the male and female components of coupling. Rather, Rook focuses on providing alternative grounding means in the form of lugs that are formed integral with the grounding sleeve. Independent grounding connections are made between the lugs to form the necessary grounding path.

Another shortcoming of the prior art is that heavy conductors of type disclosed in Rook are specifically designed to be assembled in the field by an operator using simple hand tools. While this is useful in that connectors can be assembled where and as needed, forming these connectors by hand results in less than reliable results with respect to the strength and grounding ability of these connectors. Should any of the hand assembly operations be incompletely or incorrectly carried out, the connector may not function as intended and a dangerous fault condition may result.

In industrial control and power supply applications, it is important that a coupling be extremely sturdy so as to physically protect the point at which the electric connections are made within the coupling itself. Failure to protect the electrical connection made within the coupling can result in failure of the coupling and can result in harm to the industrial device that is being controlled or to which power is being supplied or to that device's operator. One way in which this can occur is if the cable is allowed to bend too near the point at which the electrical connections are made within the coupling. Flexing of the cable tensions the conductors within the cable and can cause the electrical connections to fail. Furthermore, pressure or tension applied to the cord adjacent the coupling as where the cord is step on, bumped or run over by an object such as a fork lift may cause the connectors within a cable to pull away from the electrical connections made within the couple. Another problem with electrical supply and control connections is that the couplings used may themselves be damaged through impact or through the gnawing of vermin such as rats.

In light of the shortcomings of the prior art, it is an objective of the present invention to provide a coupling suitable for use with armored cable that provides an extremely reliable and durable grounding connection through a coupling connection. Another objective of the present invention is to provide a coupling that has a simple structure and is easy to assemble and that rigidly protects the connectors within a cable through the coupling. It is a further object of the present invention to provide a fully shielded and fully insulated electrical connector that can be inexpensively and quickly manufactured. There is yet another object of the invention to provide a coupling that does not rely on a pin and socket connection to form a ground connection through the armor of a grounded cable. Another objective of the present invention is to provide a coupling that is fully armored throughout so as to be impact resistant, impervious to vermin, and preventative of bending stresses that may cause tension on the conductors within a cable to which the couplings are attached. A final objective of the present invention is to provide a cable that can be rapidly, inexpensively, and reliably produced using dependable machine assembly operations.

These and other objectives and advantages of the invention will appear more fully from the following description made in conjunction with the accompanying drawings where like reference characters refer to the same or similar parts throughout the several views.

SUMMARY OF THE INVENTION

The objects of the present invention are realized in an armored coupling that has an integral ground connection formed therethrough. This coupling is attached to an armored cable comprising a conductor that is disposed within a conductive sheath.

A substantially rigid sleeve is sized to receive therein the armored cable. The sheath is secured to the cable by at least one set screw that is threaded through the wall of the sleeve and into the conductive sheath of the cable so as form a conduction path from the conductive sheath of the cable through the set screw and into the sleeve. A contact holder is received within a distal end of the sleeve and is constructed and arranged to receive therein the conductor of the armored cable. A substantially rigid jacket is formed over the sleeve and at least a portion of the cable extending from the sleeve. In order to facilitate a strong bond between the jacket, sleeve, and conductive cable, it is preferred to form at least one relief hole through the sleeve so that the material from which the jacket is made can enter between the sleeve and conductive cable to form a unitary structure. A slip ring is received over the sleeve to be longitudinally slidable on the sleeve between a flange extending from the distal end of the sleeve and a shoulder formed by the jacket. The slip ring is fashioned of an electrically conductive material and accordingly extends the conduction path from the sleeve to a coupling nut that is joined to the slip ring.

The armored coupling may be plugged into an outlet or coupling on a machine or may be joined to a mating or complementary coupling. The conductive cable typically comprises a plurality of conductors, though it is envisioned that in high current applications, only a single conductor will pass through the conductive cable.

The present invention may alternatively be characterized as a cable coupling having an integral ground connection formed thereacross. Each half of the coupling has a set screw that is threadedly received within a sleeve received over a first cable. The set screw forms an electrical connection between a conductive sheath of the first cable and the sleeve within which the set screw is threadedly received. A slip ring is received and retained around the sleeve and a coupling nut is secured to slip ring by means of a retaining ridge formed within the coupling nut. The retaining ridge of the coupling nut is received in a groove formed around the slip ring. Note that the retaining ridge and the groove are interchangeable vis-à-vis their relative locations on the slip ring and the coupling nut. The coupling nut is constructed and arranged to mate with a complementary coupling nut on a second coupling, e.g. a male-female coupling arrangement or an outlet of an electrically operated machine. The conduction path for grounding the conductor extends from the conductive sheath of the cable, through the set screw to the sleeve received over the cable, from the sleeve to the slip ring received therearound, and from the slip ring to the coupling nut received over the sleeve and slip ring. Preferably each half of the coupling is provided with a rigid jacket that covers at least a portion of the sleeve and the cable that extends therefrom.

The present invention also embodies a method of forming an armored cable connector that starts with the step of providing a conductor cable having a conductive sheath and at least one conductor housed within the conductive sheath. A predetermined length of the at least one conductor is then exposed.

A substantially rigid conductive sleeve is slipped over the conductor cable and an electrically conductive pathway between the conductive sleeve and the conductive sheath of the conductor cable is created by driving at least one set screw through the conductive sleeve into the conductive sheath. It is preferable to form at least one relief hole through the sleeve prior to its installation. A contact holder is attached to the at least one conductor of the conductor cable for making an electrical connection to a mating conductor cable. Once all of the conductors of the conductor cable have been connected to the contact holder, the plug end of the contact holder is inserted into the distal end of the conductive sleeve.

A rigid jacket is molded over at least a portion of the rigid sleeve and the conductor cable to strengthen the coupling and prevent unwanted tension on the conductors of the conductor cable. A slip ring is next emplaced over the rigid sleeve between the rigid jacket and a flange of the rigid sleeve. It must be noted that the slip ring can be placed over the conductor cable prior to slipping the sleeve over the conductor cable and over-molding the jacket in place.

Finally, a coupling nut is joined to the slip ring such that the coupling nut can mechanically fix the cable connector to a complementary cable connector while providing a reliable electrical connection from the conductive sheath of the conductor cable, through the at least one set screw to the rigid sleeve, and from the rigid sleeve through the slip ring and to the coupling nut joined to the slip ring.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
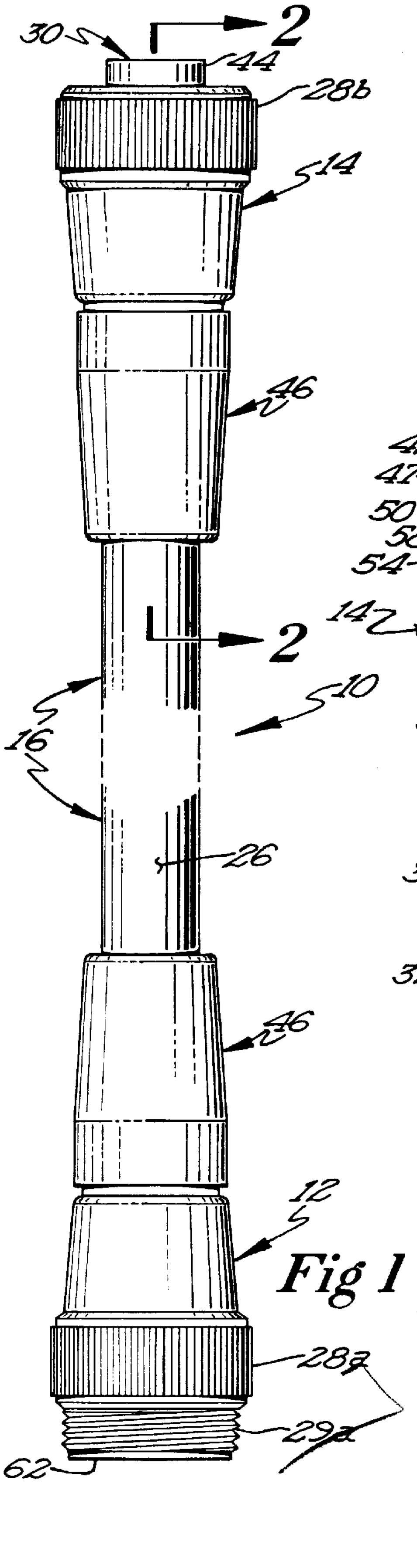
FIG. 1 is a plan view of an armored cable having respective male and female coupling portions constructed and arranged according to the present invention.
Figure 2:
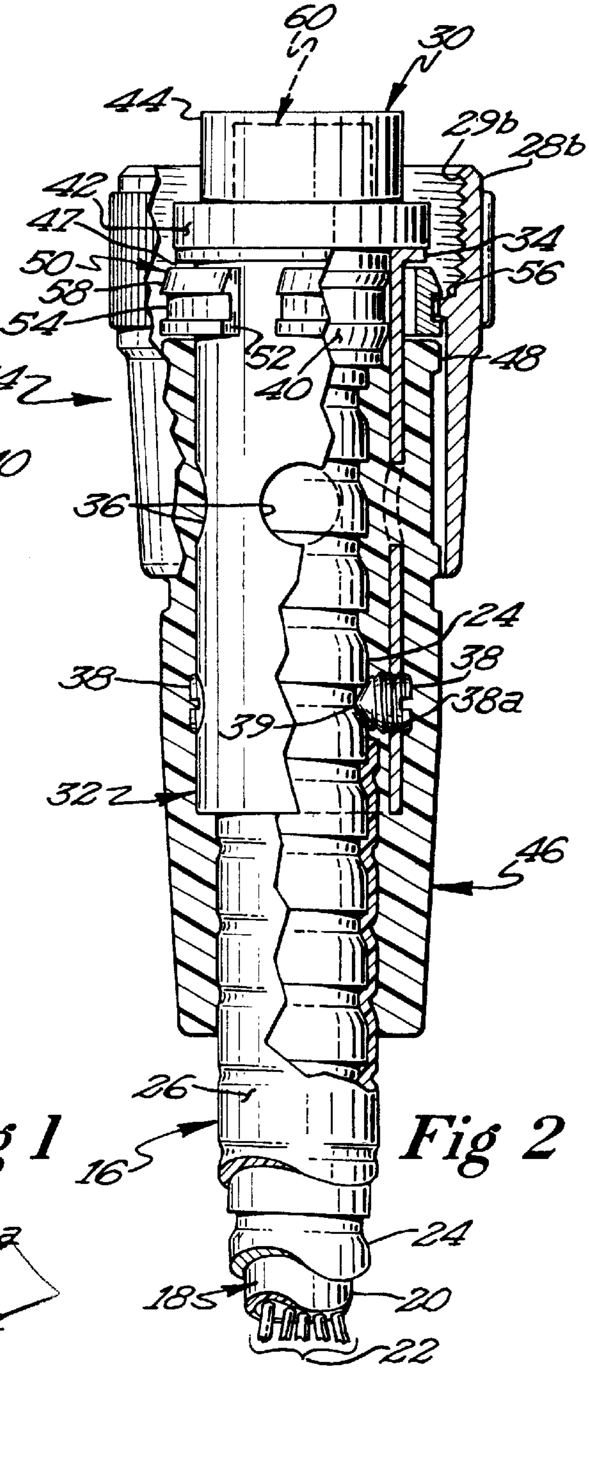
FIG. 2 is a partial cutaway view of the female coupling portion taken along cutting lines 2—2 of FIG. 1.

FIG. 1 illustrates a cable 16 having a male coupling portion 12 and a female coupling portion 14 secured to the respective ends of the cable 16. A male coupling portion 12 and a female coupling portion 14 together comprise a complete connector assembly 10. FIG. 2 is a partial cutaway view of the female coupling portion 14 that is taken along cutting lines 2—2 of FIG. 1.

The connector assembly 10 of the present invention is typically used with a armored cable 16 of the type illustrated in FIG. 2. The armored cable 16 comprises an inner cable 18 comprising a plurality of conductors 22 housed within a flexible insulating layer 20. Received over the inner cable 18 is a metal jacket 24 that, while being substantially rigid to lateral forces that would otherwise crush the cable 16, is sufficiently flexible to allow the cable 16 to be bent or coiled as needed. Over the metal jacket 24 is disposed an outer cable jacket 26 that renders the armored cable 16 water proof and which also provides added protection to abrasion and to corrosive materials that might otherwise come into contact with the metal jacket 24 or inner cable 18 of the armored cable 16. It is to be noted that armored cable 16 may comprise any suitable number of conductors 22 within the inner cable 18 without exceeding the scope of the present invention. Furthermore, it is anticipated that the present invention may be adapted for used with un-armored cables (not shown).

The male and female coupling portions 12, 14 have similar structures. The main differences between the two coupling portions being that the male coupling portion 12 in FIG. 1 has a male coupling nut 28A and the female coupling portion 14 illustrated in FIGS. 1 and 2 has a female coupling nut 28B. Where a specific coupling nut is referred to, the reference characters 28A or 28B will be used. Where coupling nuts in general are referred to, the reference numeral 28 will be used.

The respective male and female coupling portions 12, 14 typically have male and female versions of a contact holder 30 as illustrated in FIG. 2. Note that the contact holder 30 described herein is specifically designed for use with multiple conductors 22. Various types of contact holders 30 may be used without exceeding the scope of the present invention. However, in general, the contact holder 30 will have generally the same shape as is illustrated in the Figures.

Referring to FIG. 2, there is illustrated a partial cutaway view of a female coupling portion 14. As indicated above, male and female coupling portions 14 differ only in the use of male and female coupling nuts 28A and 28B and in the use of male and female contact holders 30, respectively. Therefore, for the sake of simplicity, only a female coupling portion 14 will be described in detail herein. The female coupling portion 14 essentially comprises a sleeve 32 that is received over the armored cable 16. The sleeve 32 is substantially rigid and electrically conductive. What is more, the sleeve is preferably made of steel, though other conductive materials such as copper and other metals and conductive ceramics, composites or other moldable materials may also be used.

A forward end of the sleeve 32 has a flange 34 extending therefrom. Preferably a number of relief holes 36 will be formed through the sleeve 32. The sleeve 32 is preferably secured over the armored cable 16 by one or more set screws 38 that are threadedly received within a corresponding number of bores 38A formed through the sleeve 32. The set screws 38 may have a pointed tip 39 that engages the armor 24 of the armored cable 16 thereby creating a secure and reliable electrical connection between the conductive armor 24 of the armored cable 16 and the electrically conductive sleeve 32. In addition, the use of pointed set screws 38 lends itself to a higher degree of confidence in the formation of an electrical pathway from the armor 24 of the cable 16 to the sleeve 32. Another benefit to the use of the set screws 38 with the sleeve 32 is that the armored cable 16 is also securely retained within the sleeve 32. It is to be understood that set screws 38 may also comprise tips 39 that are flat, rounded, and any other useful shape.

The contact holder 30 is preferably fashioned from a non-conductive material such as a molded plastic. The contact holder 30 is constructed and arranged to have disposed therein a plurality of pins (in a male contact holder) or pin contacts (in a female contact holder such as that illustrated in FIG. 2). Generally the contact holders 30 have a generic shape that is designed to be inserted into the sleeve 32. The contact holders 30 will differ greatly in the arrangement of the pins, pin contacts, and other contacts and connectors that are disposed therein depending on the type and nature of the application for which the connector assembly 10 is intended. Because the contact holders are essentially the same with regard to their overall configuration and differ only in the arrangement of the pins, and pin contacts, the reference numeral 60 will be used to refer to all pins and the pin contacts.

The contact holder 30 comprises a body having a plug end 40 that is constructed and arranged to be received within the front end of the sleeve 32. While the plug end 40 of the contact holder 30 may be retained within the sleeve 32 using an adhesive, a crimp, or a set screw, it is preferred to size the plug in 40 of the contact holder 30 so that there exists a press fit between the plug end 40 and the sleeve 32. Contact holder 30 has a flange 42 extending from the body thereof that limits the insertion of the plug end 40 of the contact holder 30 into the sleeve 32. The outer diameter of the flange 42 of the contact holder is roughly the same as that of the flange 34 formed on the sleeve 32. A forward receptacle portion 44 of the contact holder 30 is constructed and arranged to house therein pins or pin contacts 60, depending on whether the contact holder 30 is a male or female version. Because there exist many different structures for making electrical connections in couplings, a specific structure of the present invention is not to be limited to a contact holder having pins or pin contacts 60 as disclosed herein.

Formed over and around a sleeve 32 and a length of the armored cable 16 that extends therefrom is an over-molded jacket 46. This over-molded jacket 46 is preferably made from a non-conductive plastic material that is substantially rigid when cured. The relief holes 36 formed through the sleeve 32 act to allow the over molding material from which sleeve 46 is fashioned to flow into the interior of the sleeve 32 between the sleeve 32 and the armored cable 16. In this manner, the cable 16 is securely locked within the sleeve 32. In addition, because the jacket 46 extends past the end of the sleeve 32, any bending of the cable 16, which might otherwise tension the conductors 22 is mitigated or even prevented. The jacket 46 is molded in such a manner that there exists a gap 47 between a forward shoulder 48 of the jacket 46 and the flange 34 of the sleeve 32.

Once the jacket 46 has been emplaced, a slip ring 50 is placed in the gap 47 between the shoulder 48 of the jacket 46 and the flange 34 of the sleeve 32. The slip ring 50 has a slightly larger inner diameter than the outer diameter of the sleeve 32 and therefore, the slip ring 50 may move freely between the shoulder 48 and the flange 34 within gap 47. The slip ring 50 also has a gap or slot 52 formed therein so that the ring may be expanded slightly to fit it over the flange 42 of the contact holder 30 and the flange 34 of the sleeve 32. Alternatively, it is envisioned that that slip ring could be slipped over the cable 16 before sleeve 32 is placed over the cable 16 and them moved into its place adjacent the flange 34 before the jacket 46 is molded around the sleeve 32 and cable 16. The inner surface of the slip ring 50 is preferably smooth while the outer surface has a groove 54 formed therein. This groove is sized to receive an inwardly extending ridge 56 that is formed within coupling nut 28. The ridge 56 of coupling nut 28 is the same for the male and female embodiments of the coupling nuts 28. Note that the location of groove 54 and ridge 56 may be exchanged, i.e. the groove may be formed within the coupling nut 28 and the ridge 56 formed in the outer surface of the slip ring 50.

The retaining ring 50 also has formed therein a forwardly orientated beveled surface 58. The beveled surface 58 of the slip ring has a generally frustoconical shape and allows the ridge 56 within the coupling nuts 28 to be more easily inserted into the groove 54 formed in a slip ring. It is to be noted that both the slip ring 50 and the coupling nuts 28 must be made from an electrically conductive material, preferably from a metallic material such as steel, copper, brass or the like.

FIGS. 3–6 illustrate how one portion of the connector assembly 10 of the present invention is assembled. The first step in assembling a portion of the coupling 10 of the present invention is to expose the conductors 22 within the inner sheath 18 of the armored cable 16. To do this, a portion of the outer covering 26 of the armored cable and a portion of the armor 24 of the armored cable 16 are cut back from the inner cable 20. A portion of the inner cable 20 is itself cut back to expose the individual conductors 22. The relative exposures of the respective cable coverings 26, 24, and 20 is best seen in FIG. 2. Once an appropriate length of cable 16 has been stripped, the sleeve 32, having set screws 38 retracted to a first retracted position, is slid onto cable 16 past the exposed conductors 22. Suitable pins or pin contacts 60 are then attached to the ends of the exposed conductors 22 in a known manner, preferably by crimping or soldering. The pin or pin contacts 60 are then inserted into the appropriate contact holder 30. The pin or pin contacts 60 are typically retained within the contact holder 30 within respective bores formed therethrough by means of a friction fit or snap fit. Another manner of securing a pin or pin contact 60 within the contact holder 30 is to mold the pin or pin contact 60 into the contact holder 30. Alternatively, the pins or pin contacts 60 may be retained within the bores formed through the contact holder 30 by means of a non-conductive adhesive. The bores formed through the contact holder 30 are not illustrated herein as the size, arrangement, and number of these bores will be related directly to the number of conductors 22 of the cable 16 that are to be used and to the nature of the application to which the connector assembly of the present invention is adapted.

Figure 3:
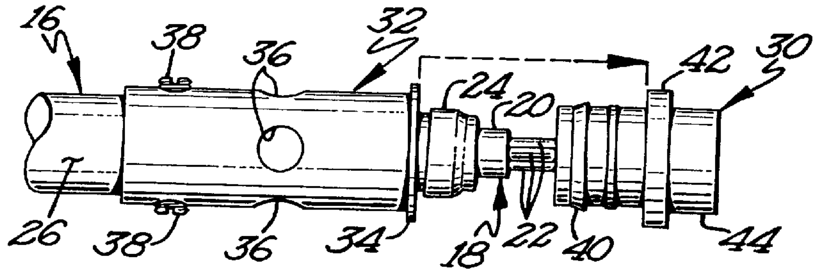
FIGS. 3–6 illustrate steps in the assembly of a female coupling portion of the present invention.

Once the pin or pin contacts 60 are emplaced within the contact holder 30, sleeve 32 is press fit onto the plug end 40 of the contact holders 30 such that the flanges 34 and 42 of the respective sleeve 32 and contact holder 30 are in contact with one another. FIG. 3. Note that the length of the inner cable 18 that is stripped must be such that the set screws 38 of the sleeve 32 may contact the armor 24 of the cable 16.

Figure 4:
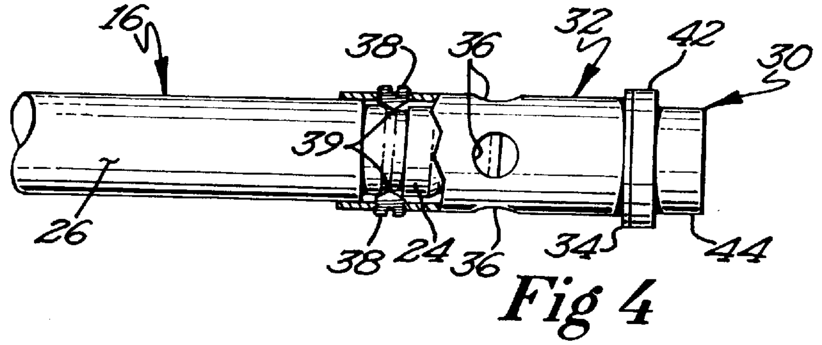

As can be seen in FIG. 4, the next step in assembling the coupling portion is to seat set screws 38 of sleeve 32 into the conductive armor 24 of the armor cable 16. The set screws 38 are driven to their second, extended position in which the tip 39 of the set screws 38 securely contact the armor 24 of the armored cable 16. Note that where a set screw 38 having a pointed tip 39 is used, the tip 39 may slightly penetrate the armor 24 of cable 16. While a pointed set screw 38 may be driven completely through the armor 24 of the cable 16, it is preferred that any penetration of the tip 39 into the armor 24 be superficial. Care must be taken not to unnecessarily deform the armor 34 of the cable 16. In this manner, a secure and reliable electrical connection is made from the armor 24 of the armored cable 16 through the set screws 38 into the sleeve 32.

Figure 5:
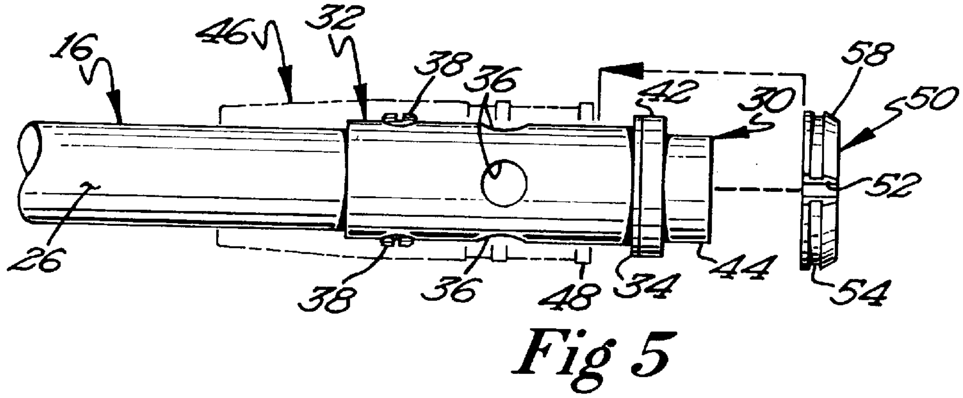

Referring next to FIG. 5, the jacket 46 is over-molded over the sleeve 32 and cable 16 that extends therefrom. In the over-molding process, the molten material from which the jacket 46 is made will be caused to flow through holes 36 formed through sleeve 32. In this manner, the material of the jacket 46 solidly encases the sleeve 32 and cable 16 so as to firmly lock the cable 16 within the sleeve. As noted above, the jacket 46 also acts to stiffen the juncture between the cable 16 and the coupling portion 12 or 14, thereby reducing tension on the conductors 22.

Next, the slip ring 50 is inserted over the flanges 34 and 42 of the sleeve 32 and contact holder 30, respectively. This is done by expanding the inner diameter of the slip ring 50 somewhat to fit over the flanges 34, 42. As indicated above, the slip ring 50 could be placed on the cable 16 behind the sleeve 32 prior to the placement of the sleeve 32 over the cable 16.

Figure 6:
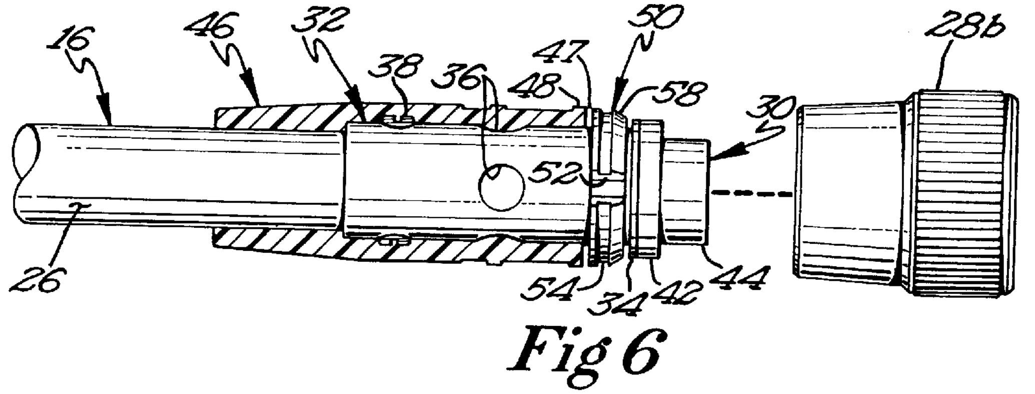

Referring next to FIG. 6, a coupling nut 28 is press fit onto the coupling portion such that the small retaining ridge 56 formed on the interior of the coupling nut 28 is received within the groove 54 formed around the slip ring 50. This results in the structure illustrated in FIG. 2 wherein a female coupling nut 28B is utilized.

Figure 7:
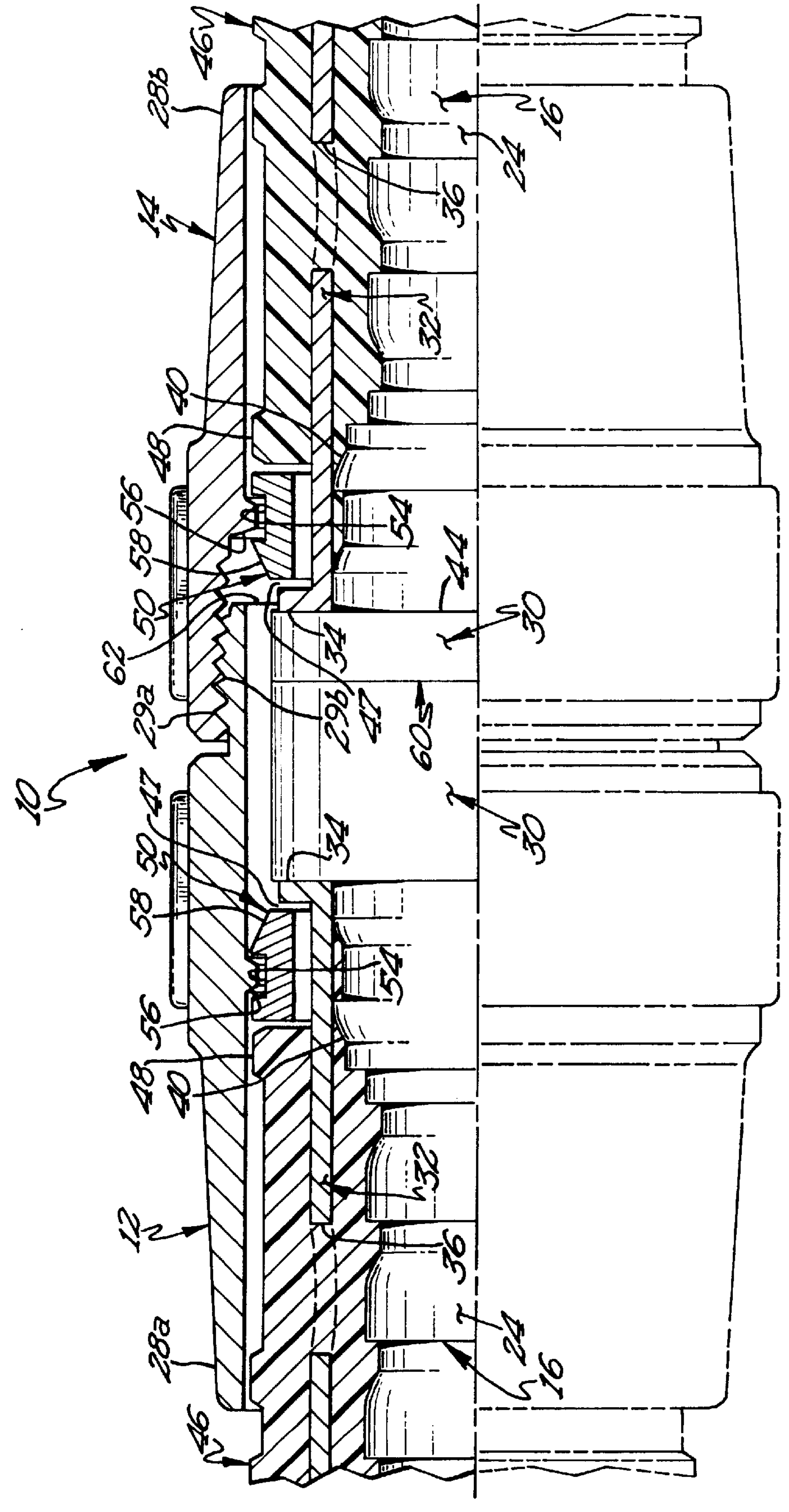
FIG. 7 is a partial cut away view of a pair of male and female coupling portions of the present invention illustrating how the coupling portions fit together.

FIG. 7 is a partial cutaway view of an entire coupling assembly 10 of the present invention wherein a male coupling portion 12 is connected to a female coupling portion 14. Specifically, FIG. 7 illustrates how a grounding connection is made through the coupling nuts 28A and 28B. The respective slip rings 50 on the male and female coupling portions 12, 14 are free to slide longitudinally in gap 47 between the jacket 46 and the flange 34 of the sleeve 32. The longitudinal travel of the slip rings 50, and of the coupling nuts 28, facilitates the mating of the threaded portion 29A of the male coupling nut 28A with the threaded portion 29B of the female coupling nut 28B. Preferably, the lengths of the respective threaded portions 29A and 29B of the male and female coupling nuts 28 are sized such that the threaded portions 29A and 29B will not bottom out when the male and female coupling portions 12, 14 are connected. Rather, as the male coupling nut 28A is threaded into the female coupling nut 28B, the retaining ridges 56 formed within each of the respective coupling nuts 28 bear against the grooves 54 formed around the slip rings 50 of the respective coupling portions. The pressure exerted by the coupling nuts 28 upon the slip rings 50 causes each of the respective slip rings 50 to bear against the flanges 34 of the respective sleeves 32 of each coupling portion. Consequently, a continuous, reliable, and extremely sturdy grounding connection is formed between the respective coupling portions of the coupling 10. Alternatively, or in addition, the end 62 of the threaded portion 29A of the male coupling nut 28A may be arranged to come into contact with the beveled surface 58 of the slip ring 50 of the female coupling portion 14 when the respective coupling portions are connected. However, it is important to arrange the threaded portions 29A and 29B of the coupling nuts 28 so that the slip ring 50 will not be forced away from the flange 34 of sleeve 32.

The grounding path through the connector assembly 10 can be traced from the armor 24 of the cable 16, through the set screws 38 and to the sleeves 32. From the sleeves 32, the grounding path continues through the flange 34 of the sleeve 32, into the slip ring 50, and thence to the retaining ridge 56 formed within the coupling nuts 28. The grounding path continues from the retaining ridge 56 of a coupling nut (either male or female) 28 through the threaded portions thereof and into the retaining ridge 56 of the complementary coupling nut. As can be appreciated, the grounding path continues from the retaining ridge 56 of the complementary coupling nut 28, through the slip ring 50, sleeve 32, and set screw 38 to the conductive armor 24 of a second portion of cable 16.

Where either the male or female coupling portion 12, 14 of the coupling 10 is constructed and arranged as a receptacle mounted in an industrial machine or other device, the grounding path will function in much the same manner. However, rather than the grounding path moving from a first cable 16 through a connector assembly 10 to a second cable 16 as indicated above, the grounding path may move from a first cable 16 through the coupling 10 to the chassis of the industrial machine or other device in a known manner.

The coupling 10 of the present invention, because of its simple design, may easily be manipulated in the field under various conditions, including cold conditions where a user of the connector assembly 10 may be wearing gloves. Furthermore, because of the sturdy nature of grounding path, the coupling 10 may be connected and disconnected repeatedly without failure of the grounding path.

The armored coupling 10 of the present convention comprises a coupling structure that has a secured, reliable, and repeatable grounding connection through the coupling itself, while simultaneously providing rigid mechanical protection to the two cables being connected through the coupling 10.

The invention described above may be embodied in other forms without departing from the spirit or essential characteristics thereof. The embodiments disclosed in this application are to be considered in all respects as illustrative and not restrictive. The scope of the invention is indicated by the appended claims rather than by the foregoing description and all changes, which come within the meaning and range of equivalency of the claims, are intended to be embraced therein.

What is claimed is:

1. An armored coupling having an integral ground connection formed therethrough comprising:

an armored cable comprising a conductor disposed within a conductive sheath;

a substantially rigid sleeve sized to receive therein the armored cable, the sheath sleeve having at least one set screw threaded through the wall of the sleeve and into the conductive sheath of the cable so as form a conduction path from the conductive sheath of the cable through the set screw into the sleeve;

a contact holder constructed and arranged to be received within a distal end of the sleeve, the contact holder being further constructed and arranged to receive therein the conductor of the armored cable;

a substantially rigid jacket formed over the sleeve and at least a portion of the cable extending from the sleeve;

a slip ring received over the sleeve and longitudinally slidable thereon between an outwardly extending flange formed in the distal end of the sleeve and a shoulder of the jacket, the slip ring being fashioned of an electrically conductive material;

a coupling nut constructed and arranged to be received over the contact holder, sleeve, and jacket, the coupling nut having an inner bore with an inwardly extended retaining ridge formed around the inner bore, the coupling nut being retained over the contact holder, sleeve, and jacket, by forcing the retaining ridge of the coupling nut into a retaining groove formed around the slip ring; and, a conduction path being formed from the conductive sheath of the cable to the set screw of the sleeve, from the set screw of the sleeve to the sleeve, from the sleeve to the slip ring, and from the slip ring to the coupling nut.

2. The armored coupling of claim 1 wherein said armored coupling is one of a male-female connector assembly.

3. The armored coupling of claim 1 wherein said male-female connector assembly further comprises a male and a female contact holder.

4. The armored coupling of claim 1 wherein said armored cable comprises a plurality of conductors.

5. The armored coupling of claim 1 wherein the rigid sleeve has formed therein at least one relief hole that permit fluidic communication between the exterior of the rigid sleeve and the armored cable.

6. The armored coupling of claim 5 wherein the rigid jacket formed over the rigid sleeve is made of thermoset material that may flow through the at least one relief hole formed through the rigid sleeve to form a solid molded rigid jacket that securely and simultaneously holds the rigid sleeve and armored cable located within the rigid sleeve.

7. A cable coupling having an integral ground connection formed thereacross wherein the ground connection comprises:

a set screw threadedly received within a sleeve received over a first cable, the set screw forming an electrical connection between a conductive sheath of a first cable and the sleeve within which the set screw is threadedly received;

a slip ring received and retained around the sleeve; and, a coupling nut retained around the sleeve by a retaining ridge formed within the coupling nut that is received within a groove formed around the slip ring, and wherein the conduction path extends from the conductive sheath of the cable, through the set screw to the sleeve received over the cable, from the sleeve to the slip ring received therearound, and from the slip ring to the coupling nut received over the sleeve and slip ring, the coupling nut being constructed and arranged to mate with a complimentary coupling portion that is electrically connected to ground.

8. The cable coupling of claim 7 further comprising a rigid jacket molded over at least a portion of the sleeve and the conductor cable extending therefrom.

9. The cable coupling of claim 8 wherein the sleeve has at least one relief hole formed therethrough such that the rigid jacket will bond to the conductive cable through the relief hole.

10. The cable coupling of claim 7 wherein the coupling is one of a male-female connector assembly.

11. The cable coupling of claim 7 wherein the coupling is connected to a complementary coupling of an electrically operated machine.

12. An armored coupling having an integral ground connection formed therethrough comprising:

an armored cable comprising a plurality of conductors disposed within a conductive sheath;

a substantially rigid sleeve sized to receive therein the cable having at least one set screw threaded through the wall of the sleeve and into the conductive sheath of the cable so as form a conduction path from the conductive sheath of the cable through the set screw into the sleeve;

a contact holder constructed and arranged to be received within a distal end of the sleeve, the contact holder being further constructed and arranged to receive therein the conductors of the cable;

a substantially rigid jacket formed over the sleeve and at least a portion of the cable extending from the sleeve;

a slip ring received over the sleeve and longitudinally thereon between an outwardly extending flange formed in the distal end of the sleeve and a shoulder of the jacket, the slip ring being fashioned of an electrically conductive material;

a coupling nut constructed and arranged to be received over the contact holder, sleeve, and jacket, the coupling nut having an inner bore with a groove formed there around, the coupling nut being retained over the contact holder, sleeve, and jacket, by forcing a retaining ridge that extends from the slip ring into the groove of the coupling; and, a conduction path being formed from the conductive sheath of the cable to the set screw of the sleeve, from the set screw of the sleeve to the sleeve, from the sleeve to the slip ring, and from the slip ring to the coupling nut.

13. A method of forming an armored cable connector comprising the steps of:

providing a conductor cable having a conductive sheath and at least one conductor housed within the conductive sheath;

exposing a predetermined length of the at least on conductor; sliding a substantially rigid conductive sleeve over the conductor cable;

forming an electrically conductive pathway between the conductive sleeve and the conductive sheath of the conductor cable by driving at least one set screw through the conductive sleeve into the conductive sheath;

attaching a contact holder to the at least one conductor of the conductor cable;

inserting a plug end of the contact holder into a distal end of the conductive sleeve;

over-molding a rigid jacket over at least a portion of the rigid sleeve and the conductor cable;

emplacing a slip ring over the rigid sleeve between the rigid jacket and a flange of the rigid sleeve; and, joining a coupling nut to the slip ring such that the coupling nut can mechanically fix the cable connector to another cable connector while providing a reliable electrical connection from the conductive sheath of the conductor cable, through the at least one set screw to the rigid sleeve, and from the rigid sleeve through the slip ring and to the coupling nut joined to the slip ring.

14. The method of forming an armored cable connector of claim 13 further comprising the step of forming at least one relief hole through the rigid sleeve prior to its installation over the conductor cable.

* * * * *